(12) United States Patent
Brumfield (10) Patent No.: US 8,266,904 B2
(45) Date of Patent: Sep. 18, 2012

(54) BUOYANCY ENGINE

(75) Inventor: Brent Allen Brumfield, Nampa, ID (US)

(73) Assignee: Brent Allen Brumfield, Nampa, ID (US)

( * ) Notice: Subject to any disclaimer, the term of this patent is extended or adjusted under 35 U.S.C. 154(b) by 537 days.

(21) Appl. No.: 12/319,203

(22) Filed: Sep. 11, 2009

(65) Prior Publication Data

US 2010/0095666 A1    Apr. 22, 2010

Related U.S. Application Data

(60) Provisional application No. 61/062,692, filed on Jan. 29, 2008.

(51) Int. Cl.
*F03B 17/02* (2006.01)
*F03D 11/00* (2006.01)

(52) U.S. Cl. ................. 60/496; 60/495; 415/92

(58) Field of Classification Search .......... 60/495, 60/496; 290/1 R, 43, 54; 415/92
See application file for complete search history.

(56) References Cited

U.S. PATENT DOCUMENTS

| 169,269 | A | * | 10/1875 | Johnson | 60/496 |
| 271,040 | A | * | 1/1883 | Cook | 60/496 |
| 272,656 | A | * | 2/1883 | Cook | 60/496 |
| 4,196,590 | A | * | 4/1980 | Fries | 60/496 |
| 6,269,638 | B1 | * | 8/2001 | Murata | 60/496 |

* cited by examiner

*Primary Examiner* — Thomas Denion
*Assistant Examiner* — Christopher Jetton (57) ABSTRACT

An energy output device that harnesses the buoyant effect produced as air rises through a plurality of finned cylinder wheels submerged in a volume of water. The finned cylinder wheels are positioned along a vertical axis above the point at which air enters into the water. The finned cylinder wheels contain a set of fins that trap the rising air so that the buoyant effect created combined with fluid gravitational farce causes the finned cylinder wheels to rotate. A plurality of intermediary gear assemblies are alternately positioned with the finned cylinder wheels linking the vertically aligned components together. The simultaneous rotation is ultimately transferred to a torque output axle gear assembly located above the alternating finned cylinder wheels and intermediary gear assemblies.

4 Claims, 12 Drawing Sheets

BUOYANCY ENGINE

Status: Provisional Patent filed Jan. 29, 2008
United States Patent and Trademark Office Application number: 61/062,692
USPTO utility patent application Ser. No. 12/319,203 confirmation #9814

PATENT SEARCH RECORD DOCUMENT

This is a record of patent search for the purpose of Patent Application pertaining to the Patent being applied for by: Brent Allen Brumfield, inventor of the "Fathom Energy System" that is a Buoyancy Engine.

The following is a summary list of Patents relative to the "Fathom Energy System" Patent being applied for at this time.

This Patent search summary is reporting no conflict of existing Patents has been found at this time relative to the "Fathom Energy System" Patent being applied for as of the date of this Patent application.

The following search record is a listing of Class, Fields and Patents searched relative to energy production involving the resources of water, liquids, air and gases:

Patent Classes (United States of America)
Patent fields of search (United States of America)
Patent documents issued referenced by filed number within the United States of America,
Foreign Patent Documentation and the "World Intellectual Property Organization"
U.S. Patent
Class: 290/1R; 290154; 415/5; 60/496
Field Search: 415/4.1; 415/5; 415/7; 415/72; 415/75; 416/7; 416/84; 417/62; 417/62; 417/83; 417/100; 417/225; 417/330; 417/331; 417/333: 417/405; 60/398; 60/407; 60/495; 60/496;
U.S. Patent
Documents: U.S. Pat. Nos. 0,271,040; 0,272,656; 0,756,791; 0,861,580; 1,424,160; 1,996,886; 2,037,973; 2,135,110; 2,484,183; 3,194,008; 3,412,482; 3,918,827; 3,934,964; 3,961,479; 3,961,480; 3,970,415; 3,984,698; 3,994,134; 4,028,893; 4,038,826; 4,054,031; 4,084,375; 4,095,426; 4,185,464; 4,196,590; 4,207,741; 4,208,878; 4,218,192; 4,233,813; 4,242,868; 4,245,473; 4,254,622; 4,266,402; 4,284,183; 4,285,279; 4,309,154; 4,317,046; 4,325,216; 4,326,132; 4,327,296; 4,333,311; 4,363,212; 4,392,062; 4,407,130; 4,455,833; 4,471,613; 4,498,294; 4,603,551; 4,674,281; 4,683,720; 4,703,821; 4,713,937; 4,718,232; 4,718,233; 4,726,188; 4,739,182; 4,742,242; 4,748,808; 4,805,406; 4,885,723; 4,981,015; 5,125,233; 5,303,552; 5,372,474; 5,436,508; 5,456,787; 5,555,728; 5,921,082; 5,944,480; 5,996,344; 6,009,707; 6,018,947; 6,115,950; 6,195,991; 6,269,638; 6,305,165; 6,831,631; 6,769,253; 6,914,339; 6,933,624; 6,957,543; 6,962,052; 6,981,373; 6,990,809; 7,140,180; 7,213,398; 7,216,483; 7,257,946; 7,293,960; 7,865,723
Foreign Patent
Documents:
European: F03B9/00B; F03B17/02; F03B17/00;
World Intellectual Property Organization: (WO/2004/067953) "HYDRO-PNEUMANATOR";
(WO/2006/082403) "LOW-HEAD WATER WHEEL";

INITIAL STATEMENT

Let it be noted that the FES invention is not being claimed to be a perpetual motion machine. The FES invention requires an Air Fuel (psi/cfm) supply to charge the FES and provide the FES with continuous Air Fuel input (psi/cfm) for the FES to operate.

For the purpose of this Patent document let it be noted that various fluids or gasses could be combined within the Fathom Energy System (FES) however for the literacy of this document all fluids or gasses will be referred to as water or air.

The process of the FES is a clean or "Green Energy" process that is environmentally nonpolluting as well as contributing to the purification of air as a result of the FES torque energy production process.

The FES invention scope of application scaled sizes ranges from residential to commercial. The inventor intends the construction and use of the FES to be compliant with all Local, State and Federal applicable compliance requirements related to Safety, Use and Operation of such a device.

The Inventor also intends for the invention to be used in such a manor that it is beneficial to the health of Earth's Environment and Inhabitants.

The Energy harvesting by the FES is a non-combustive process involving the uplift force reaction of air fuel (cfm/psi) rising within its controlled water environment.

BACKGROUND OF THE INVENTION

1. Field of the Invention
Archimedes' principals of Buoyancy and Leverage
Newton's principals of Mass and Gravity
Study of physics principals, relative to Buoyancy/Leverage and Mass/Gravity, have provided the basis for the Prato Type proof of this Energy Harvesting Buoyancy Motor. Study reveals that the utilization of application of these principals can work both for and against a desired outcome.

Study of Gravity Engines and Buoyancy Engines reveals design processes of harvesting energy either from the gravitational force from the mass of a volume of fluid surrounded by a volume of gas or the buoyancy of a volume of gas surrounded by mass of a volume of fluid.

This invention is generally related to Buoyancy Engines and is specifically related to Buoyancy Engines that harvest the natural reaction force of air as that said air rises in water.

2. Description of Prior Art
Buoyancy Engines are designed to be fueled by pre-pressurized gas(es), compressed air, exhaust from mechanical process plants as well as venting gas or air from below the Earth's surface. A study of attempts at creating a Buoyancy Motor has been made by reviewing documented Patent records ranging from L. G. Cook U.S. Pat. No. 0,271,040 dated Jan. 23, 1883 to Welch JR. U.S. Pat. No. 7,257,946 dated Aug. 21, 2007.

NOTE: Buoyancy as defined by Archimedes' principal of "pressure force, buoyancy and floatation states; "The buoyant force acting upward on a floating body is equivalent to the weight of the displaced fluid".

The study shows other factors must be considered such as the density of materials and gas within the materials that comprises the sum of the floating body as well as the floating body's free or forced placement relative to surface line of a fluid a body it is placed in.

Study of the draft depth of boats confirms that porosity or cavity confinement of gas within a body, placed in a fluid environment, contributes additional buoyancy force causing the mass of that said body to rise higher in relationship to the fluid surface line effecting the mass sum and volume equality of the mass sum of the body relative to fluid displacement.

The study of Prior Art reveals efficiency problems that prevent cost effective net output energy relative to net input energy. The efficiency dilemma, of Prior Art, is due to several negative inertial coefficients of internal and external mechanical parts in their operational process as well as back pressure burden to gas or air supply systems they are fueled by (specifically, exhaust derived, gas or air fuel supply systems). The Prior Art of LG. Cook 1883 U.S. Pat. No. 2,741,040 and Denis A. De Shon's 2003 U.S. Pat. No. 6,631,631 bear striking resemblances to each other and are apparatuses' that attempt to harvest the buoyant energy of air yet neither are engineered like the FES Buoyancy Engine described in this Patent document.

OBJECTIVES AND ADVANTAGES OF THE FATHOM ENERGY SYSTEM INVENTION RELATIVE TO FIELD OF STUDY

The unique and energy efficient Buoyancy Engine design described in the "Summary FES Mechanical Assembly" portion of this document fulfills multiple objectives of 1) simple construction, 2) efficient energy production, 3) reduced maintenance costs by implementing numerous non mechanical internal components constructed of light weight materials. The implementation of non mechanical internal components results in lowered inertial losses, economizing construction costs as well as reducing operational maintenance cost. 4) canceling negative inertia by buoyant core design within the finned cylinder wheels. The buoyant finned cylinder wheel core design reduces gravitational bearing drag coefficients.

The objective to reduce negative inertial friction coefficients of moving parts. Reduction of negative inertial friction drag coefficients, of each finned cylinder wheel, is accomplished by the unique design of their buoyant cylindrical core combined with the unique aero/aqua dynamic fin design and a unifying inline linking gear assembly. The aero/aqua dynamic fin design accomplishes 1) timed and inertially correct non mechanical reception of air into the cavities within each finned cylinder wheel, 2) an unprecedented 180 degree retention of air within the cavities of each finned cylinder wheel as each finned cylinder wheel rotates, 3) inertially correct, mechanical timed, gravitational water purge of air from within the cavities 4) each fin having a near zero negative inertial drag coefficient, at their outer surface wing tail edge, while they are rotationally moving in the controlled water environment. Unique finned wheel design combined with the inline linking gear assembly (energy transfer power train) optimizes the invention's power output process.

The objective to optimize the output energy harvested by the invention. Optimized output energy is achieved by uniting all the geared and finned cylinder wheels with intermediary axles (a mechanical uniting assembly) transferring the energy of leverage air uplift, collectively as one RPM torque force sum internally to an elevated output axle drive shaft eliminates the negative inertial pressure from housing penetrating shaft seals that would occur below the water level line within the invention. Transfer of leverage air uplift energy harvested thru the unifying inline gear linked power train assembly provides the most economical transfer of the said harvested energy as well as yielding high torque RPM output energy values.

The objective of constructing versatile climate zone use of the Buoyancy Engine is accomplished by incorporating insulation into the housing design combined with internal air/water temperature control. External water and air lines are to have adequate thermal variance protective wraps. Temperature control systems optimize the Buoyancy Engine's performance when the invention is subjected to temperature variances.

The objective of achieving large scale applications with maximum energy output efficiency design is accomplished by uniting multiple units inline. Successful multiple inline unit assembly is accomplished by decreasing the finished construction height and core parts of each successive Buoyancy Engine by the height of one tinned cylinder wheel, one intermediary geared axle with air collection/transfer diaphragm assembly. The exhaust air (psi/cfm) from the largest unit supplies the air (psi/cfm) to the next largest unit in a step down pattern. Uniting, multiple successively height reduced, Buoyancy Engines significantly lowers the cost of input air (psi/cfm) required to fuel a multiple unit system. Joining successively smaller scale Buoyancy Engines inline is another multi unit inline step down alternative. Utilizing reduced height or reduced scale, step down assembly, when uniting Buoyancy Engines inline, helps overcome the ratio of net input energy cost to useable net output energy.

This Buoyancy Engine invention accomplishes the objective to provide an end user safe, economical as well as environmentally safe means of producing power for residential and commercial applications.

BRIEF DESCRIPTION OF SUBMITTED DRAWINGS OF THE FATHOM ENERGY SYSTEM INVENTION

Note: Drawings submitted are not to scale and are not authorized for use without expressed consent of the Inventor.

FATHOM ENERGY SYSTEM

Parts List

1) Insulated water housing.
2) insulated side closure access panels (attached to (1) by fastening hardware).
3) Gasketed seal plate affixed to (1).
4) Finned cylinder wheel.
5) Solid cylindrical core ([A] portion of finned cylinder wheel that is key wayed or having a splined center to receive axle and seal bonded to (6) at ends).
6) Solid circular end caps of finned cylinder wheel (key wayed or splinned center to match (5) reception of axle).
7) Hollow cylindrical core [B] portion of finned cylinder wheel seal bonded to (6) at ends. Air sealed between core [A] and core [B] provides sufficient buoyancy for the entire finned cylinder wheel assembly and its axle [11].
8) Cylinder wheel fin. Each fin identically curved and spaced around each core [B] portion of finned cylinder wheel assembly) each fin curvature is such to allow air from bellow to rise into cavity open spacing of fins and allow air exit from same said cavity open spacing of fins from water purge thru rotation.

9) Outer edge of fin (8) identically curved to match outer perimeter arc of (6). Each fin having an identical sculpted outer edge and equal cubic volume area spacing for air.
10) Ring gear. Attached to the outside of tinned cylinder wheel end caps (6)
11) Finned cylinder wheel axle.
12) Intermediary axle.
13) Intermediary axle gear.
14) Torque output axle.
15) Torque output axle gear.
16) Axle collar plate washer.
17) Key way pin. (Note: axles maybe splined as an alternative means to Interlock with finned cylinder wheel or intermediate axle gears and torque axle gears.
18) Securing nut.
19) Lock nut.
20) Flanged bearing assembly.
21) Flanged bearing assembly having internal facing water shed membrane.
22) Outer bearing bracket for torque output axle shaft tail(s).
23) Sheave pulley.
24) Subordinate Sheave pulley and Spindle to alternator, generator or turbine power output equipment.
25) Torque RPM transfer belt.
26) Valve and float assembly for maintaining internal water level.
27) Water supply line to valve/float assembly (24).
28) Air (psi/cfm) supply pipe.
29) Water drain pipe for servicing FES.
30) Air (psi/cfm) insertion and water backflow prevention assembly.
31) Water fill pipe.
32) Exhaust air pipe.
33) Air insertion diaphragm. Non mechanical.
34) Air collection/transfer diaphragm.
35) Surface water turbulence diffusion diaphragm.
36) Spacer.
37) Air transfer orifice ports.
38) Sealed passage sleeve. (Allows intermediate axle to slide through the body of the air collection/transfer diaphragm (34) without operational process air loss.)

SUMMARY

FES Mechanical Assembly

Figure 1:
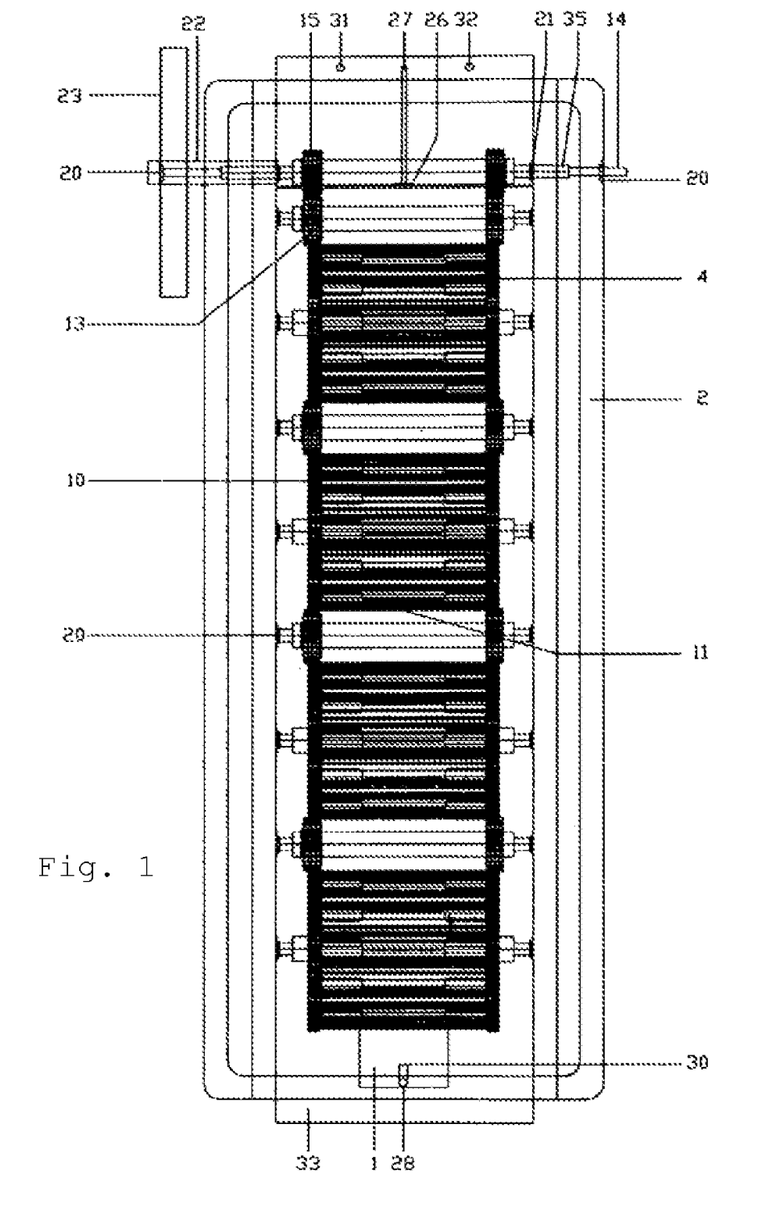
FIG. 1) Is an end view (elevation section).
Figure 2:
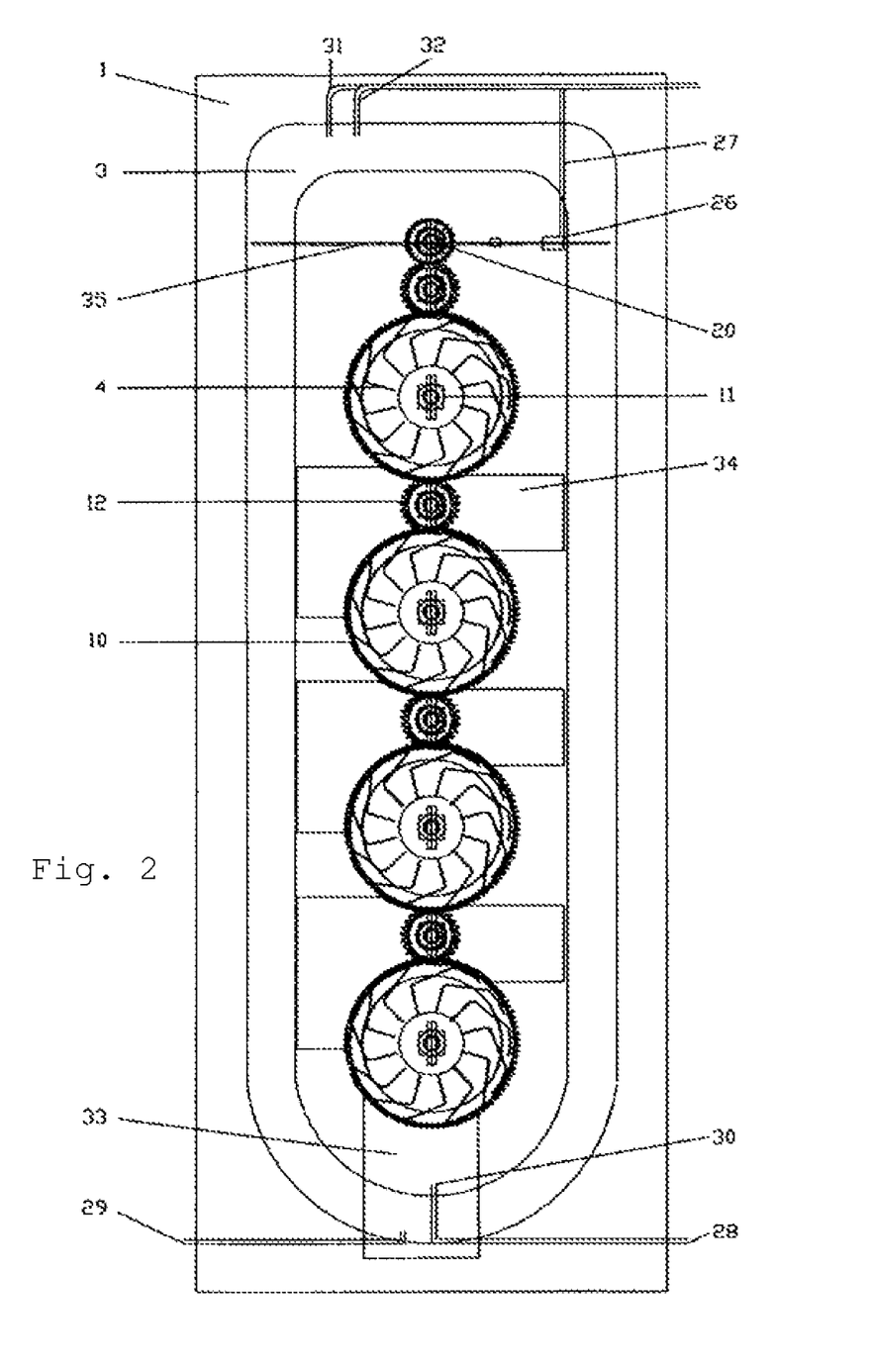
FIG. 2) Is a side view (elevation section).
Figure 3:
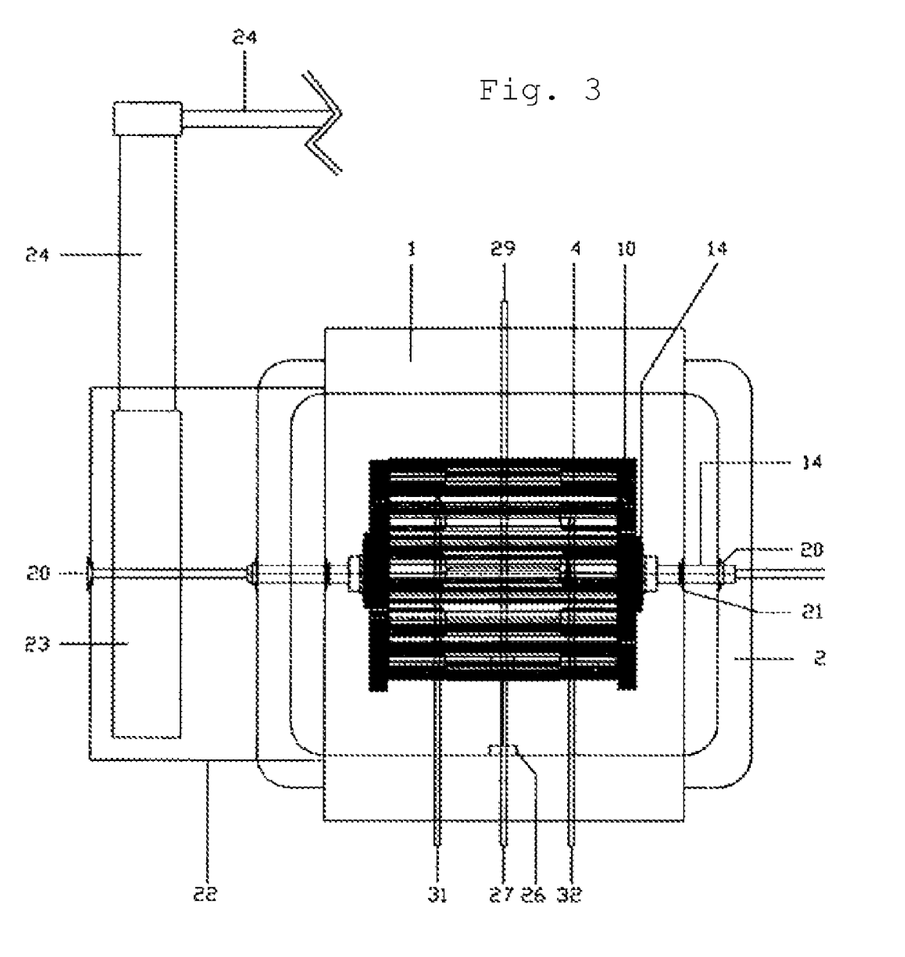
FIG. 3) Is a top view.
Figure 4:
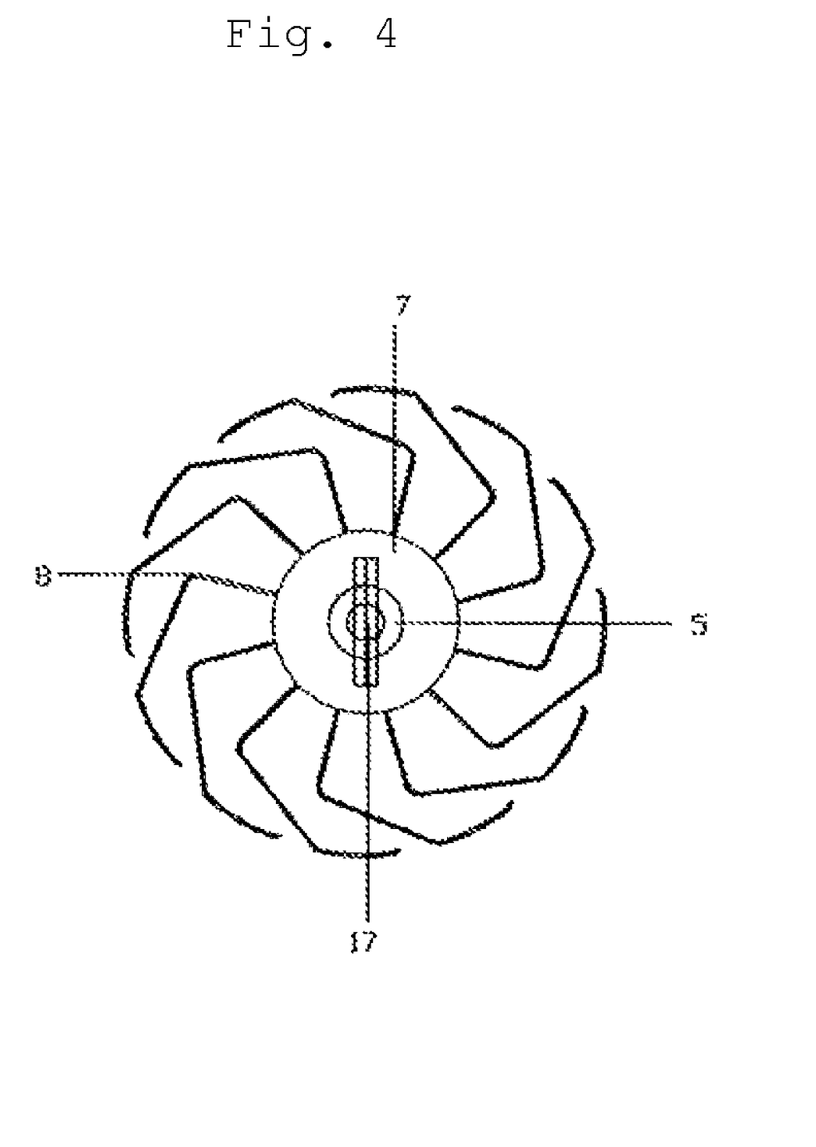
FIG. 4) Is a core section view of a finned cylinder wheel.
Figure 5:
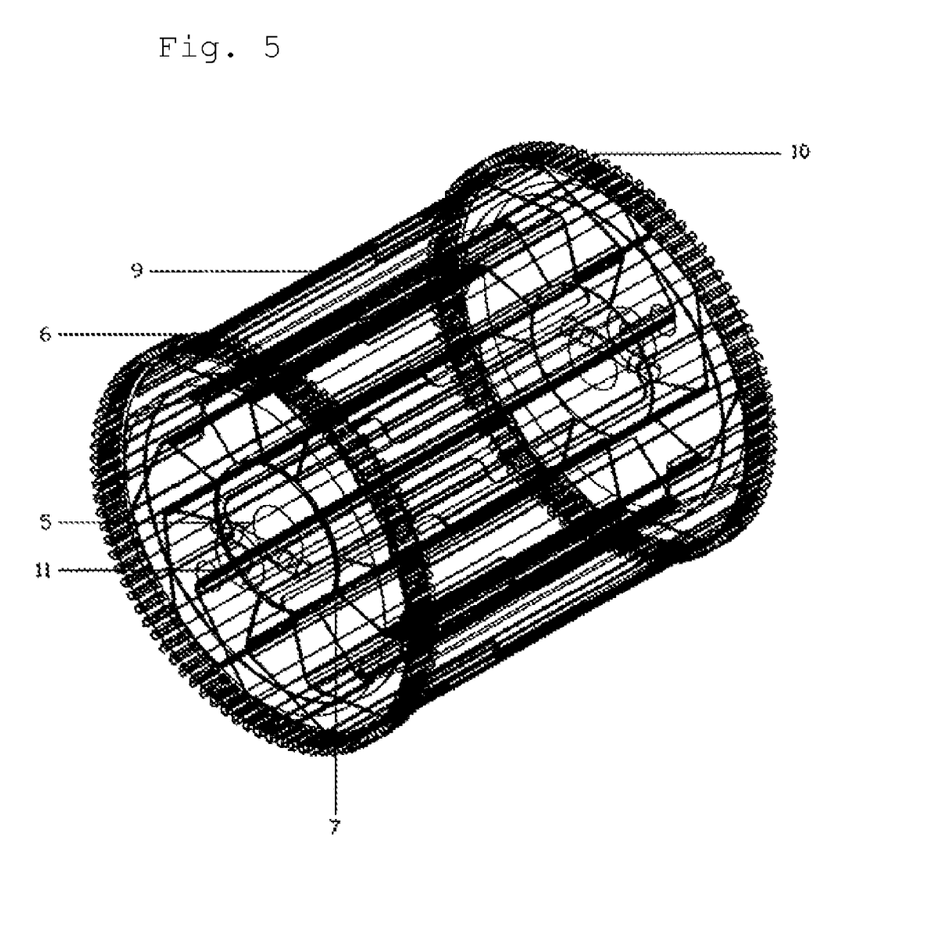
FIG. 5) Is an assembly view of a geared finned cylinder wheel and axle.
Figure 6:
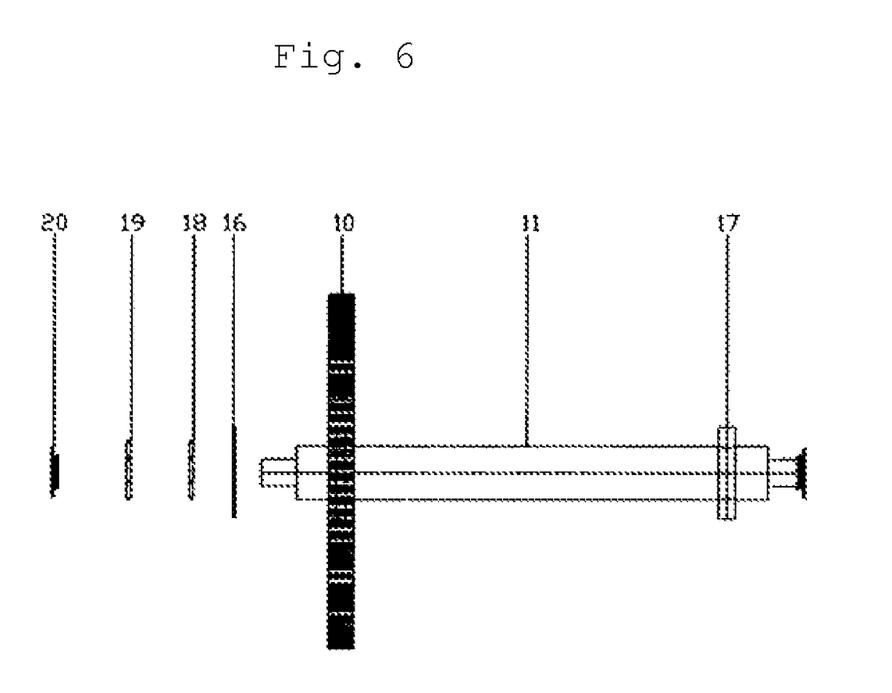
FIG. 6) Is a view of finned cylinder axle assembly.
Figure 7:
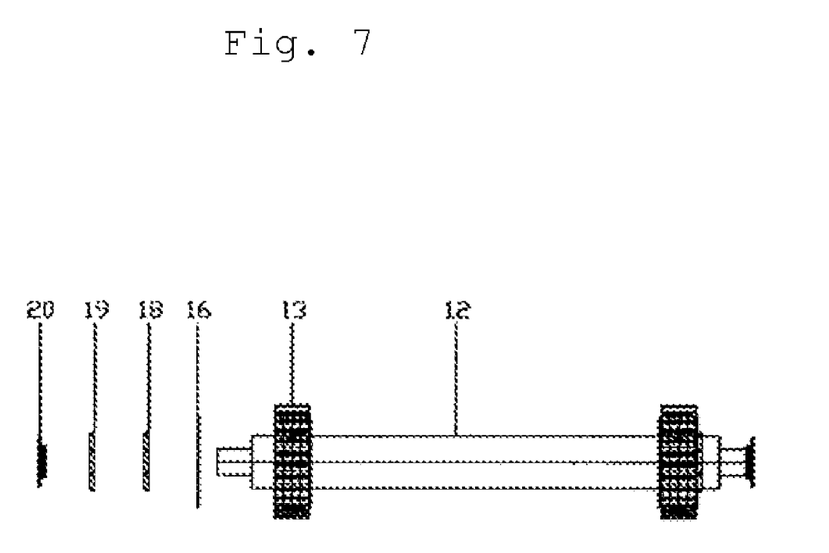
FIG. 7) Is a view of an intermediary axle.
Figure 8:
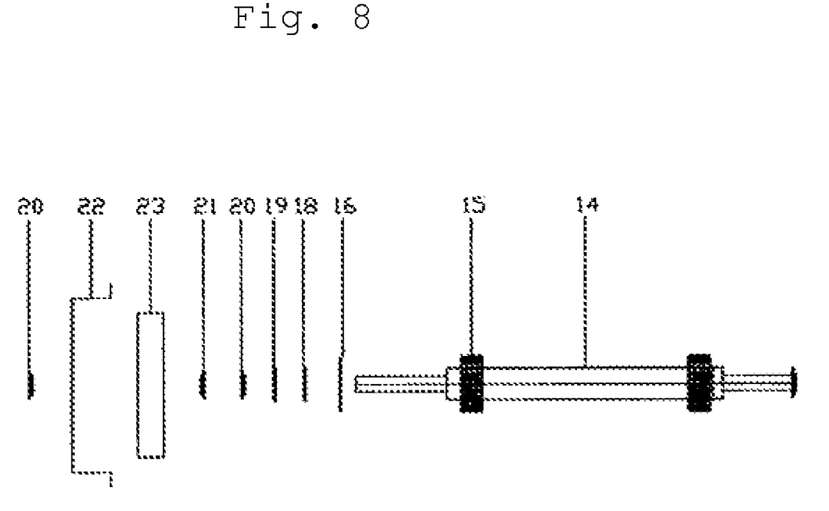
FIG. 8) Is a view of a torque output axle assembly.
Figure 9:
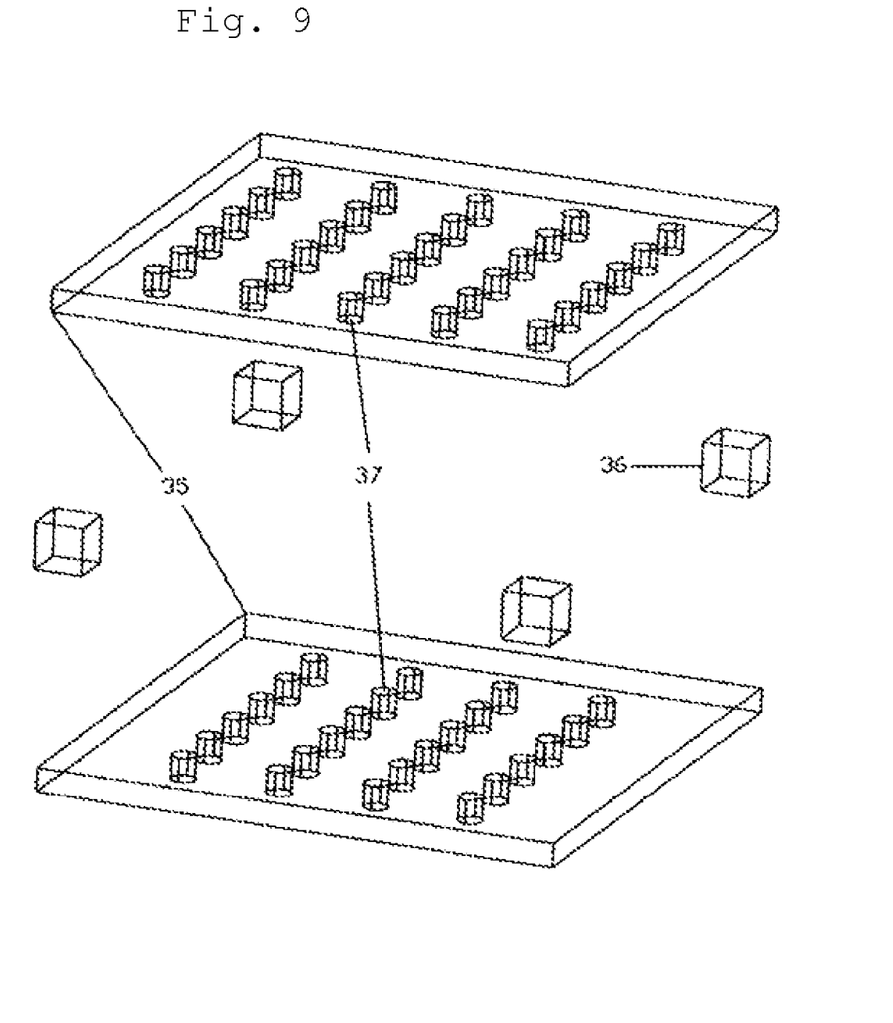
FIG. 9) Is an air diffusion panel assembly view.
Figure 10:
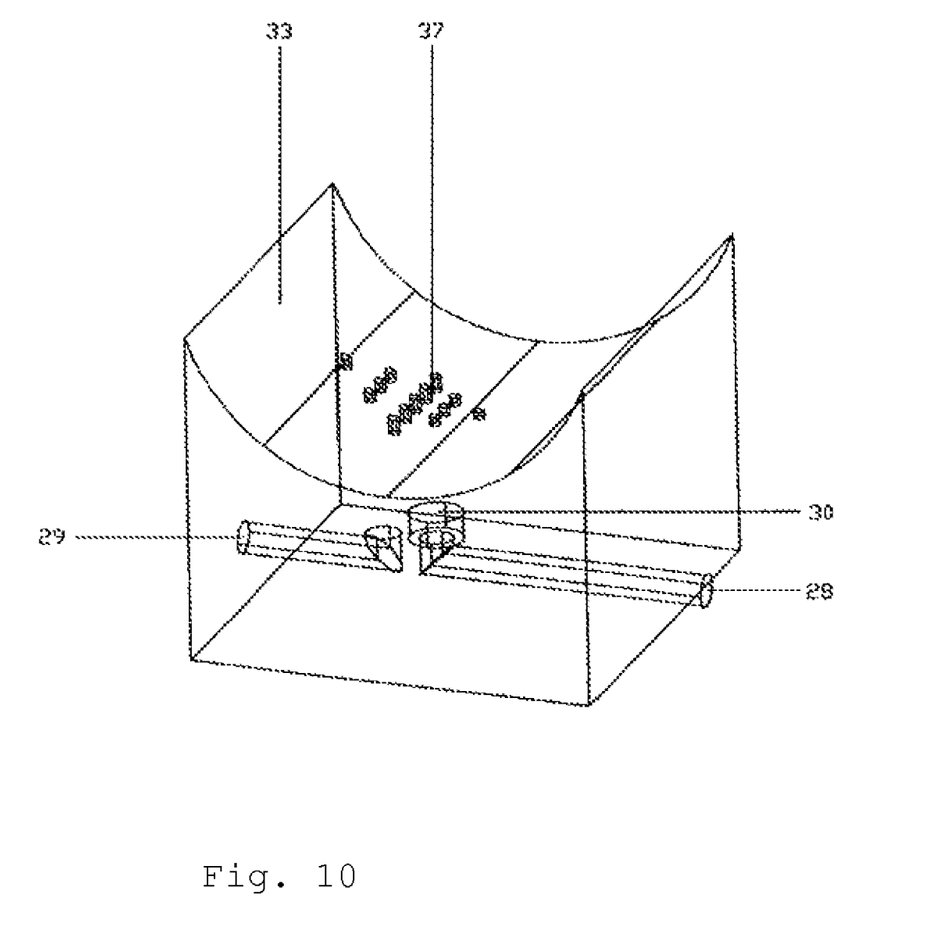
FIG. 10) Is an air Insertion diaphragm view.
Figure 11:
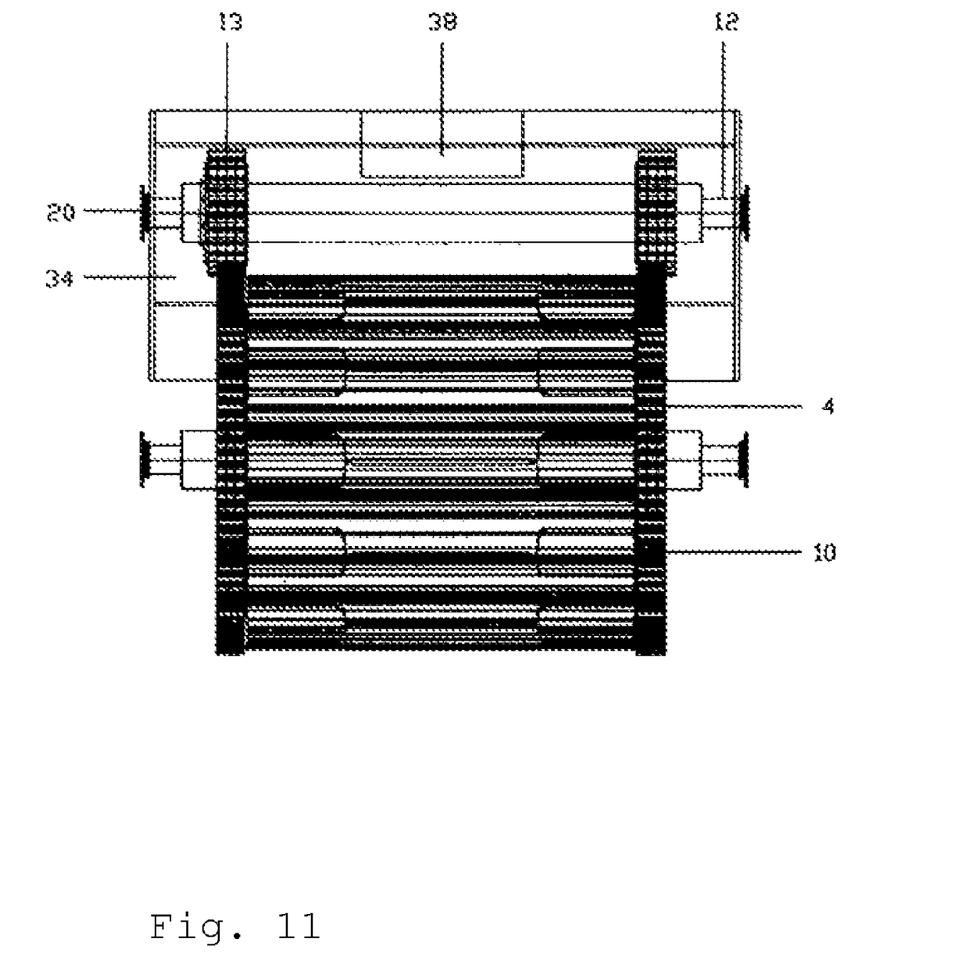
FIG. 11) Is a side view of an air collection/transfer diaphragm (viewed with a finned cylinder wheel assembly)
FIG. 12) Is a top view of an air collection/transfer diaphragm (viewed with finned cylinder wheel assembly).
Figure 12:
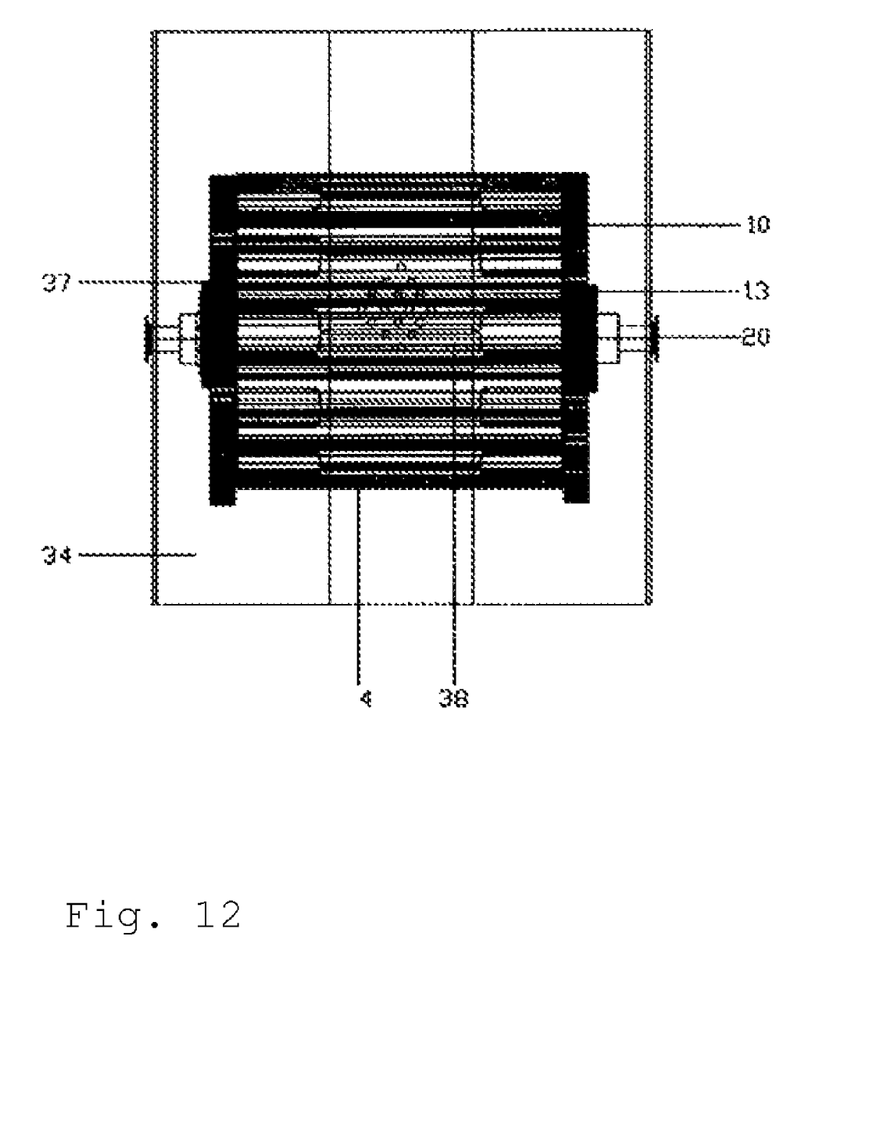

Note; The "Summary of the FES Invention's Mechanical Process Assembly" has been numerically referenced to items in the attached parts list of this Patent document and are cross reference-able to numbers on the submitted drawing pages FIG. 1 thru FIG. 12 that are also part of this Patent document.

The FES's torque power harvesting process capitalizes on the natural reaction force of air rising into cavities (9), within finned cylinder wheel (4) assemblies that are submerged in a controlled water environment, using radial arm leverage principals to fulcrum axles (11).

The air (psi/cfm) required to initially charge the FES is the air (psi/cfm) needed to over come the water pressure weight relative to the depth of water in the FES (1) and fill the air receptive, directionally rotating, cavities (9) between the fins (8) of the bottom geared finned cylinder wheel (4) causing the axle gear (10, 13 & 15) linked finned cylinder wheels (4) to begin rotation cycle from the leveraged uplift force of the said input air.

The cavity (9) space between the fins (8) is a result of fin (8) spacing as well as each fin's (8) identical curved design to maximize the retention of buoyant air in water as the geared (10) finned cylinder wheels (4) rotate on axle assemblies (11) horizontally. All fins (8) in each geared finned cylinder wheel (4) are facing the same rotational direction. After the rotationally positioned air receptive cavities (9) have been initially charged with air, the running air (psi/cfm) for the FES is equal to the air (psi/cfm) to over come the water pressure weight relative to the depth of water within the FES continually filling the directionally air receptive cavities (9) between the fins (8) of the lowest geared finned cylinder wheel (4) thru power output RPM, continuous rotational running cycle speed.

Torque energy production within the FEB is fueled by a specific volume of continuously supplied air (psi/cfm). The specific volume of continuously supplied air (psi/cfm) is released into the FES housing (1 & 2) by an air Insertion diaphragm (33) having non-mechanical air release transfer orifices (37).

The air (psi/cfm) supplied to the FES insertion diaphragm (33) enters said diaphragm thru an incorporated backflow preventive valve assembly (29). Once supplied air passes thru the air insertion diaphragm assembly (32), within the FES said air's uplift force is repeatedly harvested as said air naturally rises within the FES controlled water environment. Air up lift force is repeatedly harvested using mechanical leverage principals within the FES's alternating component core comprised of; axles (11, 12 & 14) and gears (10, 13 & 15), finned cylinder wheels (4) and non mechanical air collection/transfer diaphragms (34).

Each air collection/transfer diaphragm has timing positioned air release orifices (37). The FES finned cylinder wheels (4) are vertically and alternately spaced apart by non mechanical air collector/transfer diaphragms (34). Each of the non mechanical air collector/transfer diaphragms (34) has a horizontally sleeved (38) geared axle (12 & 13) centered in vertical alignment with all other axles (11 & 14) and gears (10 & 15) within the FES.

The continuous air (psi/cfm) flow volume inserted into the FES, alternately and non mechanically, vertically rises into and out of each FES's finned cylinder wheel's (4) cavities (9) then into and out of each FES's non mechanical air recollection/transfer diaphragms (34). The leverage uplift force, of cavity (9) retained air, causes the geared (10) finned cylinder wheel (4) assemblies to rotate their fulcrum axles (11). The harvested leverage uplift force, converted to torque/RPM energy, is then transferred thru the linking gear (13 & 15) axle (12 & 14) assemblies to the torque output geared (15) axle (14) assembly.

The repetitive harvesting of leveraged air uplift force is simultaneous collected from each successive geared (10) and finned cylinder wheel (4) by linking gears (13) on the intermediary axles (12) that are alternately meshed with the gears (10) on the finned cylinder wheels (4) and then transferred to a vertically Inline geared (15) torque output axle (14)

Each gear finned cylinder wheel's (10 & 4) rotation combined with each of their fin's (8) Identical horizontal outer sculpted lip edge (9) design allows for air reception into the geared (10) and finned cylinders wheels (4) beginning at approximately the 05:40 clock position of rotation. Each geared (10) and finned cylinder wheel (4) is then caused to rotationally turn upon it's axle (11) by the uplift leveraged force of air retained in cavities (9) between its directional air retaining fins (8) within the water environment of the FES (1 & 2).

At approximately the 12:00 position of each finned cylinder wheels (4) rotation the said retained air is non-mechanically purged out of the cavities (9) between the fins (8), within the geared (10) and finned cylinder wheels (4), by the gravitational displacement of water within the FES enclosed housing (1 & 2).

The gravitational purging weight force of water, at specific downward rotational timing of the finned cylinder wheels (4) cavities (9) contributes to the harvestable leverage energy by the finned cylinder wheels (4) of the FES.

The core of each of the geared (10) finned cylinder wheels (4) has a sealed cylinder core (7) filled with air equal to the prevailing elevation air pressure and equal to approximately 25% or more of each geared (10) finned cylinder wheel's (4) total cubic volume. The air filled core (7) of each geared (10) finned cylinder wheel (4) counter reacts the total gravitational weight of the geared (10) finned cylinder wheel (4) in water by buoyancy thus reducing bearing wear (20) and inertial drag coefficients.

The geared (10) finned cylinder wheels (4) are horizontally mounted in the system, having gears (10) attached at both vertical ends (6). each finned cylinder wheel has a horizontally sleeved axle (11) thru its solid core (5). The tinned cylinder wheels (4) are centered and equally spaced vertically being secured in position by water proof bearings (20) that are mounted in the internal vertical parallel sides (2) of the insulated side closure access panels (2).

The geared (10) and finned cylinder wheels (4) are linked vertically by intermediary gears (13) on axles (12). The intermediary axle (12) ends are inserted into centered and vertically spaced waterproof bearings (20) on the inside of the side closure access panels (2) as the finned cylinder wheel's axles (11).

The FES has a geared (15) torque output axle (14). The torque output axle (14) shaft tails are the only axle tails that protrude thru and extend outside of the FES assembled housing (1 & 2). All bearings (20) within the FES are mounted in or on the parallel vertical internal sides of the FES housing's insulated side closure panels (2). Each air collection/transfer diaphragm (34) has an intermediary axle (12) horizontally sleeved (38) thru it. The incorporated sleeve (38) within each of the air collection/transfer diaphragm's (34) structural body prevents air loss, from within each air collection/transfer diaphragms (34), from having the intermediary axle (12) pass thru it's (34) body.

The non mechanical release of air from each geared (10) and finned cylinder wheel's (4) directionally air receptive, retaining and releasing fin (8) assembly rises naturally within the internal water environment of the FES (1 & 2) into each non mechanical air collection/transfer diaphragm (34) that is positioned in vertical alignment, above said geared (10) and finned cylinder wheels (4). Each air collection/transfer diaphragm (34) collects the released air from a lower geared (10) and finned cylinder wheel (4) and then channels that air to the next geared (10) and finned cylinder wheel (4) above it until that said air is finally released from the of the FES (1 & 2) and is allowed to exhaust back into the atmosphere thru an air vent (32).

The initial air insertion diaphragm (33) has a water pressure opposing backflow valve (30) plumbed into it's structural body performing the air (psi/cfm) transfer into the FES (1 & 2) from the incoming air (psi/cfm) supply pipe (28). The water pressure opposing backflow valve (30) inertially opposes the weight of water relative to the depth of water within the FES (1 & 2). The initial air insertion diaphragm (33) and successive air collection/transfer diaphragms (34) in the FES (1 & 2) contribute no inertial losses because there are no mechanical processes within the FES related to air insertion/recollect or transfer of air. An air collection/transfer diaphragm (34) collects released air from a finned cylinder wheel (4) below it (33) and transfers that collected air to a finned cylinder wheel (4) above it (34) by a collection chimney design and timing aligned air release orifices (37). Air collection/transfer diaphragms (34) are positioned above each finned cylinder wheel (4) in centered and vertical alignment within the FES except for the upper most finned cylinder wheel (4).

The FES housing (1 & 2) is comprised of a thermal variance rated insulation core wall having an outer surface that is UV resistant. The FES housing (1 & 2) is structurally designed to resist the outward water or air pressure from within the FES.

The FES housing has leveling legs at it's base (not shown in drawings), a plumbed air supply inlet pipe (28), a plumbed water fill pipe (31), a plumbed water supply inlet pipe (27), a plumbed air exhaust pipe (32), a water temperature control system (not shown in drawings), as well as a water level float/control valve (26) assembly.

What I claim as my invention the "Fathom Energy System" (FES) is as follows:

1. A vertically aligned buoyancy engine comprising:
   a housing containing a volume of water;
   an air supply pipe fluidly connected to a lower portion of the housing for supplying air into the water;
   a plurality of finned cylinder wheels positioned along a vertical axis of the housing above the air supply pipe, the finned cylinder wheels submerged in the water and each including an axle, a cylindrical core assembly, a set of fins connected to the outer circumferential surface of the core assembly, and a pair of circular end caps, wherein the axle is rotatably secured to the housing;
   a plurality of ring gears, each positioned on the outer circumference of the end caps;
   a plurality of intermediary gear assemblies alternately positioned with the finned cylinder wheels along the vertical axis, each intermediary gear assembly including an intermediary axle, wherein the intermediary axle is rotatably attached to the housing; and
   a torque output axle gear assembly located above the alternating finned cylinder wheels and intermediary gear assemblies along the vertical axis, the torque output axle gear assembly including an output axle extending outside the housing;
   wherein the ring gears and the intermediary gear assemblies are meshed in their alternating positions, and the torque output axle gear assembly is meshed with the uppermost intermediary gear assembly, and air introduced by the air supply pipe rises into and out of each finned cylinder wheel causing a rotation that is transferred to the output axle.

2. A vertically aligned buoyancy engine according to claim 1, the core assembly further comprising:
   a volume of air contained in a space defined by an inner solid cylindrical core, an outer hollow cylindrical core, and the two end caps, wherein the air is sealed within this space to provide a buoyant effect.

3. A vertically aligned buoyancy engine according to claim 1, further comprising:
   a plurality of air collection and transfer diaphragms, each positioned to direct rising air from one finned cylinder wheel to the next finned cylinder wheel.

4. A vertically aligned buoyancy engine according to claim 1, further comprising:
   an electrical generating device connected to the output axle extending outside the housing.

* * * * *